(12) United States Patent
Hirao

(10) Patent No.: US 6,629,036 B2
(45) Date of Patent: Sep. 30, 2003

(54) METHOD AND APPARATUS FOR RECOGNIZING PRECEDING VEHICLE WITH DETERMINATION OF CURVED TRAFFIC LANE

(75) Inventor: Manabu Hirao, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/061,056

(22) Filed: Jan. 29, 2002

(65) Prior Publication Data
US 2002/0103600 A1 Aug. 1, 2002

(30) Foreign Application Priority Data
Jan. 30, 2001 (JP) ........................................ 2001-022315

(51) Int. Cl.$^7$ .............................................. G06F 17/00
(52) U.S. Cl. .......................... 701/301; 701/96; 342/69; 340/435
(58) Field of Search .................... 701/96, 301; 342/69, 342/70; 340/425.5, 435, 436

(56) References Cited

U.S. PATENT DOCUMENTS

| | | | |
|---|---|---|---|
| 4,757,450 A | * | 7/1988 | Etoh ........................... 701/96 |
| 5,633,642 A | | 5/1997 | Hoss et al. |
| 6,011,507 A | | 1/2000 | Curran et al. |
| 6,265,990 B1 | * | 7/2001 | Isogai et al. ................. 340/903 |

FOREIGN PATENT DOCUMENTS

EP  0928714  7/1999

* cited by examiner

*Primary Examiner*—Yonel Beaulieu
(74) *Attorney, Agent, or Firm*—Scully, Scott, Murphy & Presser

(57) ABSTRACT

In a method for recognizing a preceding vehicle traveling on a traffic lane on which a subject vehicle is traveling, it is determined whether or not the preceding vehicle is deviated from a preceding vehicle recognizing region ahead of the subject vehicle. Then, when the preceding vehicle is deviated from the preceding vehicle recognizing region, it is determined whether or not the traffic lane is curved while maintaining recognition of the preceding vehicle. When the traffic lane is curved, it is determined whether or not the preceding vehicle has entered the preceding vehicle recognizing region for a predetermined time period while maintaining the recognition of the preceding vehicle. As a result, the recognition of the preceding vehicle is maintained or released in accordance with whether or not the preceding vehicle has entered the preceding vehicle recognizing region for the predetermined time period.

21 Claims, 20 Drawing Sheets

NO LANE CHANGE ON NON-CURVED EXPRESSWAY

LANE CHANGE ON NON-CURVED EXPRESSWAY

NO LANE CHANGE ON CURVED EXPRESSWAY

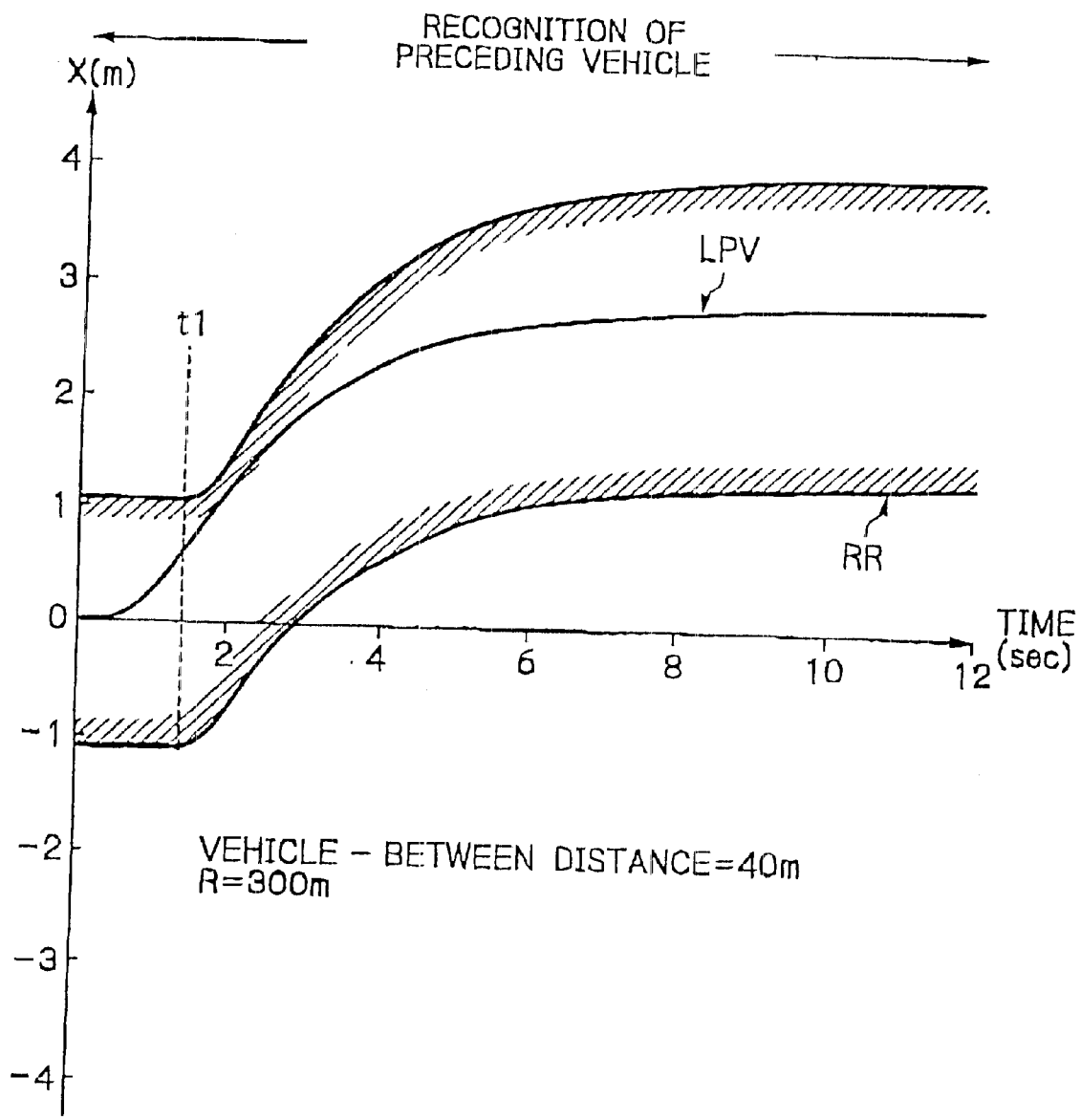

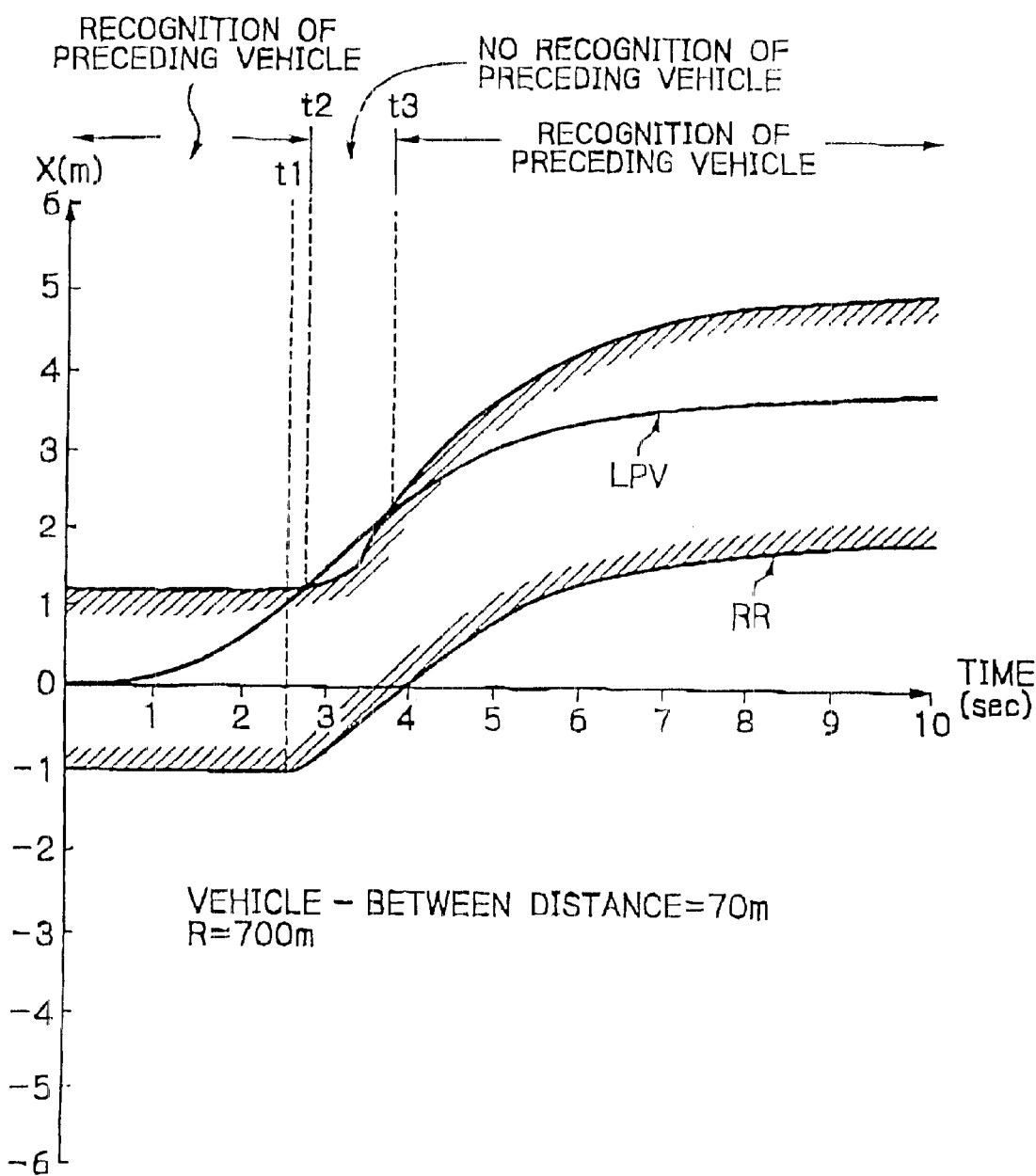

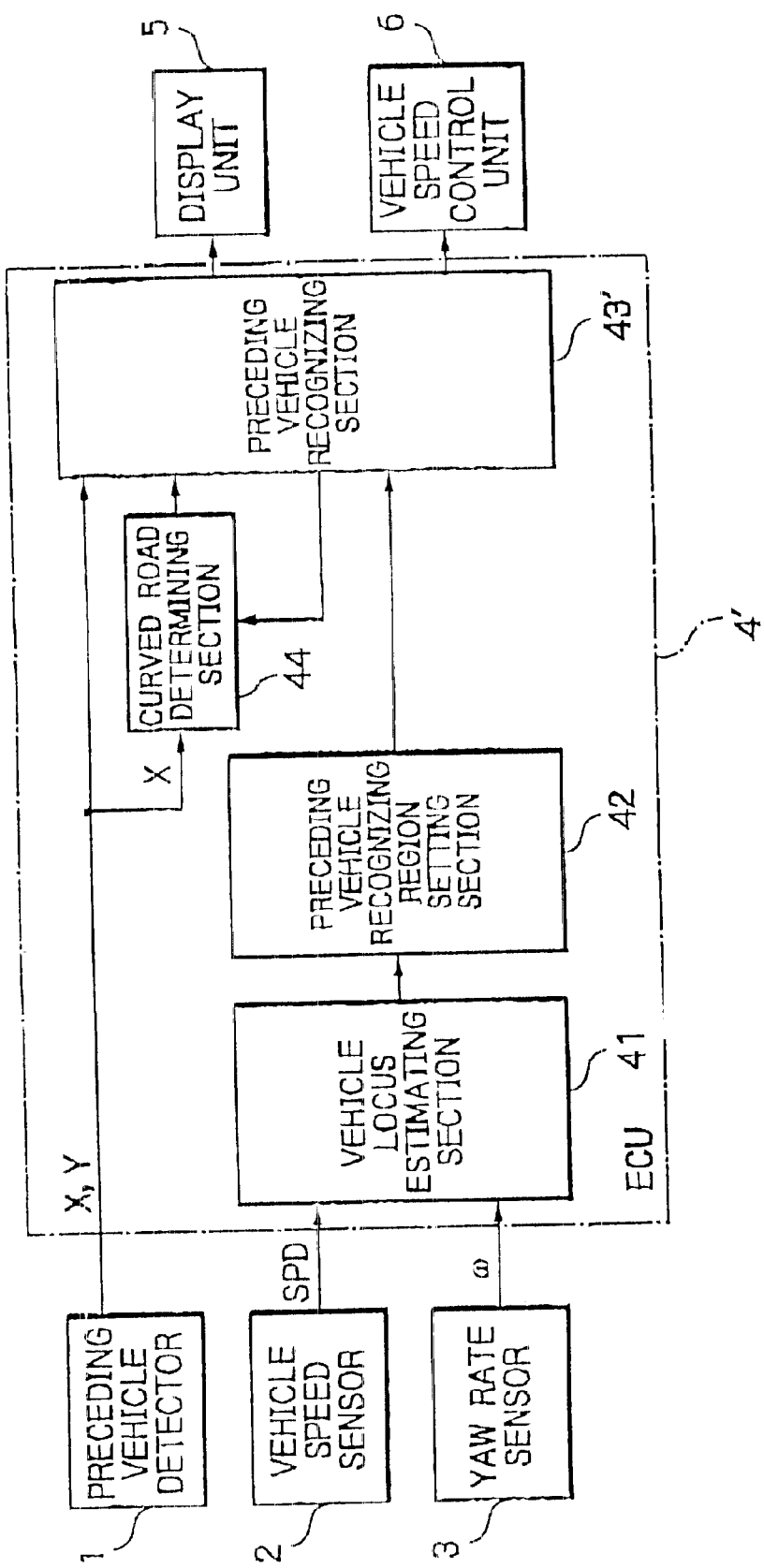

METHOD AND APPARATUS FOR RECOGNIZING PRECEDING VEHICLE WITH DETERMINATION OF CURVED TRAFFIC LANE

BACKGROUND OF THE INVENTION

1. Field of the Invention

The present invention relates to a method and apparatus for recognizing a preceding vehicle traveling on a traffic lane on which a subject vehicle is traveling.

2. Description of the Related Art

Apparatuses for recognizing a preceding vehicle have been used to carry out a vehicle speed control, so that the distance between the preceding vehicle and a subject vehicle is brought close to a definite value.

In a prior art apparatus for recognizing a preceding vehicle ahead of a subject vehicle, it is determined whether or not the preceding vehicle is within a preceding vehicle recognizing region ahead of the subject vehicle. As a result, determination of the preceding vehicle is carried out immediately in accordance with whether or not a preceding vehicle is within the preceding vehicle recognizing region. This will be explained later in detail.

In the above-described prior art preceding vehicle recognizing apparatus, however, when the traffic lane on which the preceding vehicle is traveling is curved, the preceding vehicle may be lost within the preceding vehicle recognizing region, even though the preceding vehicle keeps traveling on the same traffic lane. This erroneous recognition of the preceding vehicle would fluctuate the vehicle speed control.

SUMMARY OF THE INVENTION

It is an object of the present invention to provide a method and apparatus for surely recognizing a preceding vehicle even when traveling along a curved traffic lane.

According to the present invention, in a method for recognizing a preceding vehicle traveling on a traffic lane on which a subject vehicle is traveling, it is determined whether or not the preceding vehicle is deviated from a preceding vehicle recognizing region ahead of the subject vehicle. Then, when the preceding vehicle is deviated from the preceding vehicle recognizing region, it is determined whether or not the traffic lane is curved while maintaining recognition of the preceding vehicle. When the traffic lane is curved, it is determined whether or not the preceding vehicle has entered the preceding vehicle recognizing region for a predetermined time period while maintaining the recognition of the preceding vehicle. As a result, the recognition of the preceding vehicle is maintained or released in accordance with whether or not the preceding vehicle has entered the preceding vehicle recognizing region for the predetermined time period.

Also, in an apparatus for recognizing a preceding vehicle traveling on a traffic lane on which a subject vehicle is traveling, a preceding vehicle recognizing section sets a preceding vehicle recognizing region ahead of the subject vehicle. A preceding vehicle determining section determines whether or not the preceding vehicle is within the preceding vehicle recognizing region. A curved road determining section determines whether or not the traffic lane is curved while maintaining recognition of the preceding vehicle, when the preceding vehicle is deviated from the preceding vehicle recognizing region. The preceding vehicle recognizing section further determines whether or not the preceding vehicle has entered the preceding vehicle recognizing region for a predetermined time period while maintaining the recognition of the preceding vehicle, when the traffic lane is curved. As a result, the recognition of the preceding vehicle is maintained, when the preceding vehicle has entered the preceding vehicle recognizing region for the predetermined time period. On the other hand, the recognition of the preceding vehicle is released, when the preceding vehicle has never entered the preceding vehicle recognizing region for the predetermined time period.

BRIEF DESCRIPTION OF THE DRAWINGS

The present invention will be more clearly understood from the description set forth below, as compared with the prior art, with reference to the accompanying drawings, wherein:

FIGS. 8A, 8B and 8C are timing diagrams of the third example of the operation of FIG. 7;

FIG. 9 is a block circuit diagram illustrating an embodiment of the preceding vehicle recognizing apparatus according to the present invention;

DESCRIPTION OF THE PREFERRED EMBODIMENT

Before the description of the preferred embodiment, a prior art preceding vehicle recognizing apparatus will be explained with reference to FIGS. 1, 2, 3, 4, 5, 6, 7 8A, 8B and 8C.

Figure 1:
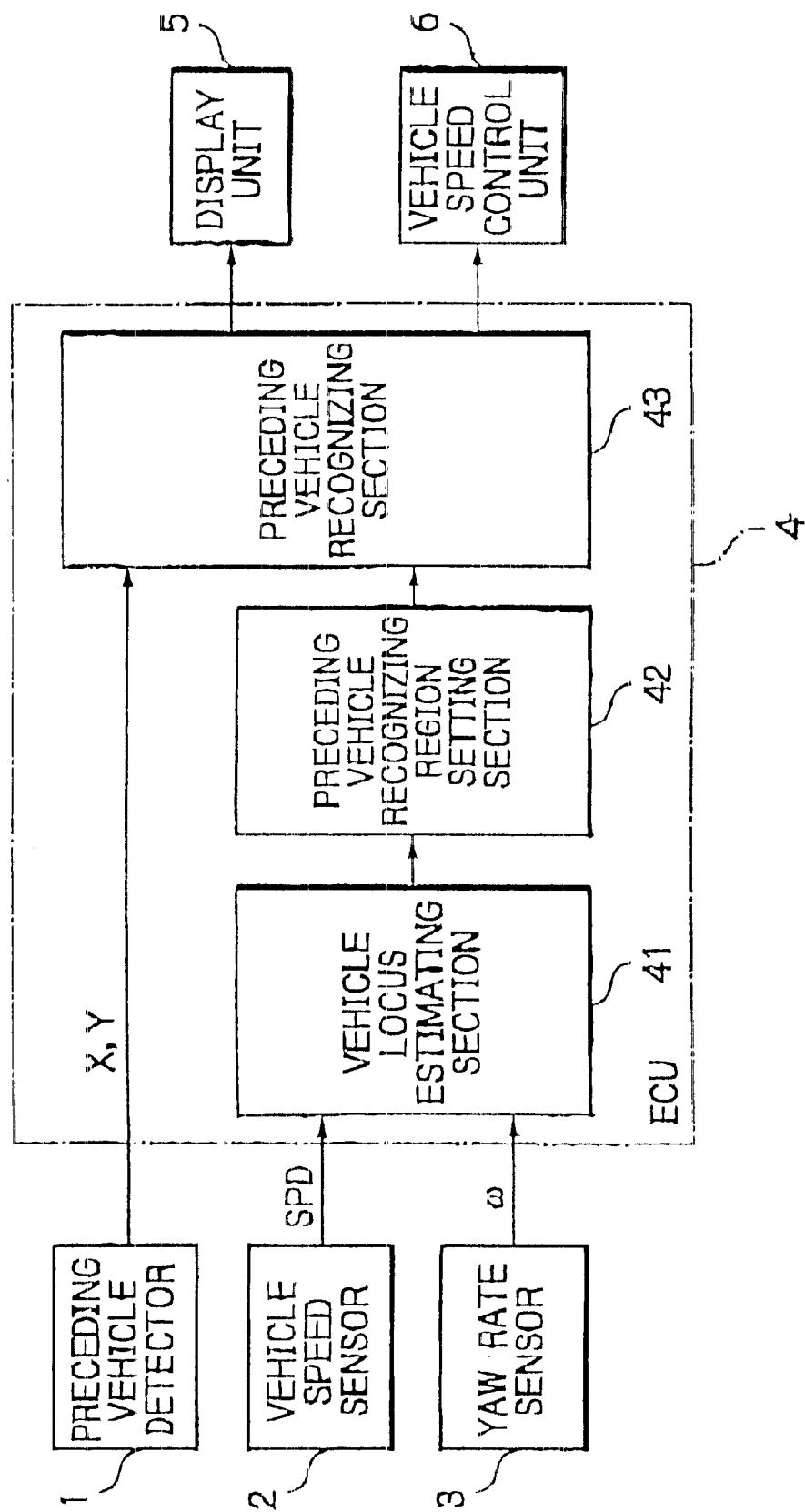
FIG. 1 is a block circuit diagram illustrating a prior art preceding vehicle recognizing apparatus.
Figure 3:
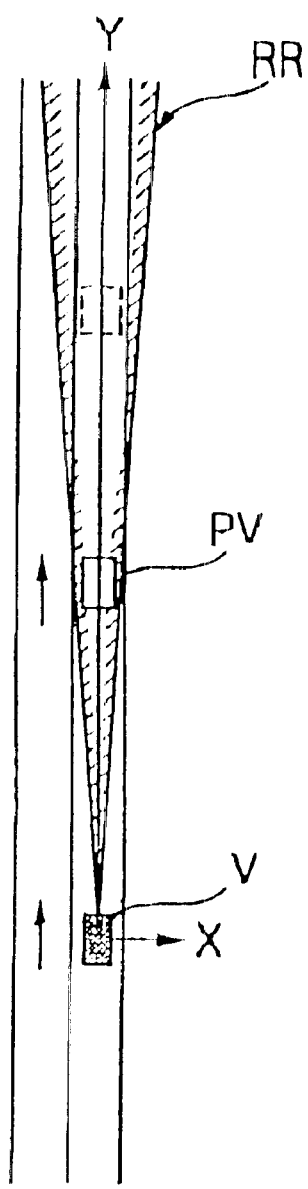
FIG. 3 is a diagram illustrating a first example of the operation of the preceding vehicle recognizing apparatus of FIG. 1.
Figure 5:
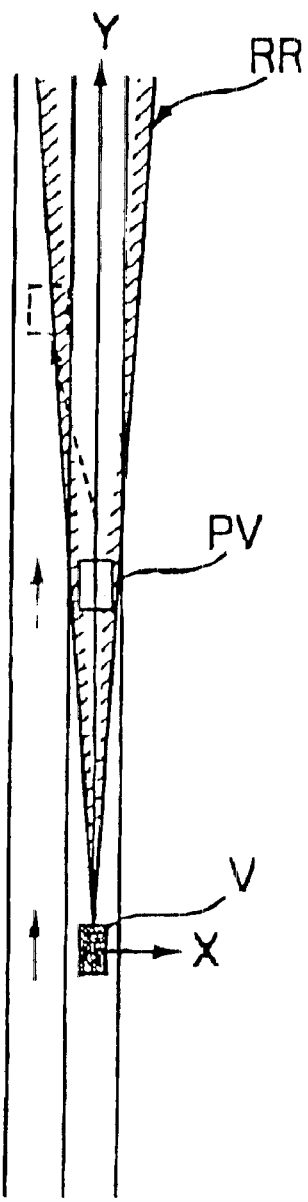
FIG. 5 is a diagram illustrating a second example of the operation of the preceding vehicle recognizing apparatus of FIG. 1.
Figure 7:
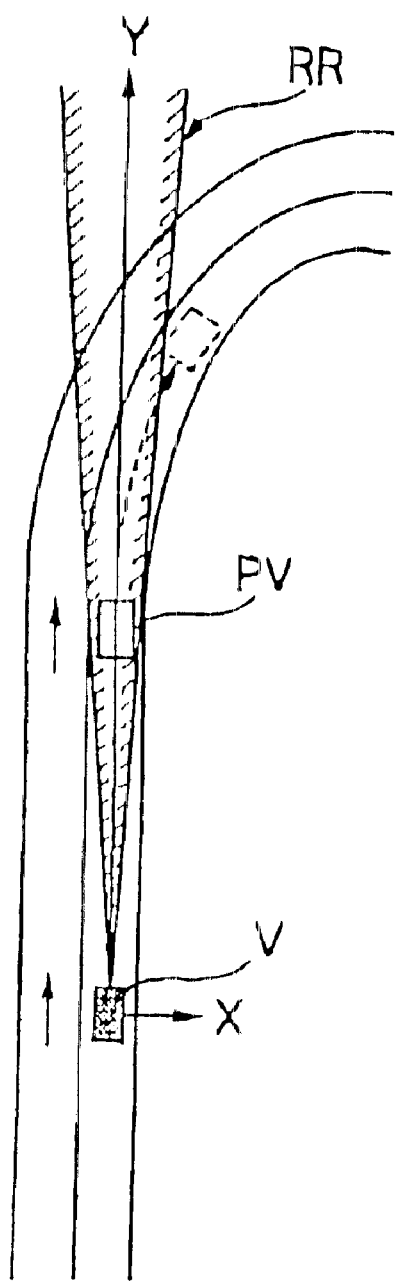
FIG. 7 is a diagram illustrating a third example of the operation of the preceding vehicle recognizing apparatus of FIG. 1.

In FIG. 1, which illustrates a prior art preceding recognizing apparatus, reference numeral 1 designates a preceding vehicle detecting sensor for detecting X- and Y-locations of a preceding vehicle PV (see FIGS. 3, 5 and 7). The preceding vehicle detecting sensor 1 is constructed by a scan laser radar including a semiconductor laser device. The preceding sensor 1 calculates a distance between the preceding vehicle PV and a vehicle V(see FIGS. 3, 5 and 7) on which the preceding vehicle recognizing apparatus of FIG. 1 is mounted, in accordance with the time difference between a laser radiation timing and its reflected laser radiation reception timing, and then, calculates X- and Y-locations of the preceding vehicle PV using the above-mentioned distance and a scan angle of the laser radiation.

Reference numeral 2 designates a vehicle speed sensor for detecting a speed SPD of the vehicle V, and 3 designates a yaw rate sensor for detecting a rotational angular speed ω of the vehicle V.

The X- and Y-locations of the preceding vehicle PV of the preceding vehicle sensor 1, the vehicle speed SPD of the vehicle speed sensor 2 and the rotational angular speed ω of the yaw rate sensor 3 are supplied to an electric control unit (ECU) 4.

The electric control unit 4 is connected to a display unit 5 for displaying the X- and Y-locations of the preceding vehicle PV and a vehicle speed control unit 6 for controlling the speed of the vehicle so that the distance between the vehicle V and the preceding vehicle PV is brought close to a definite value.

The electronic control unit 4 is constructed by a vehicle locus estimating section 41, a preceding vehicle recognizing region setting section 42 and a preceding vehicle recognizing section 43.

Figure 2:
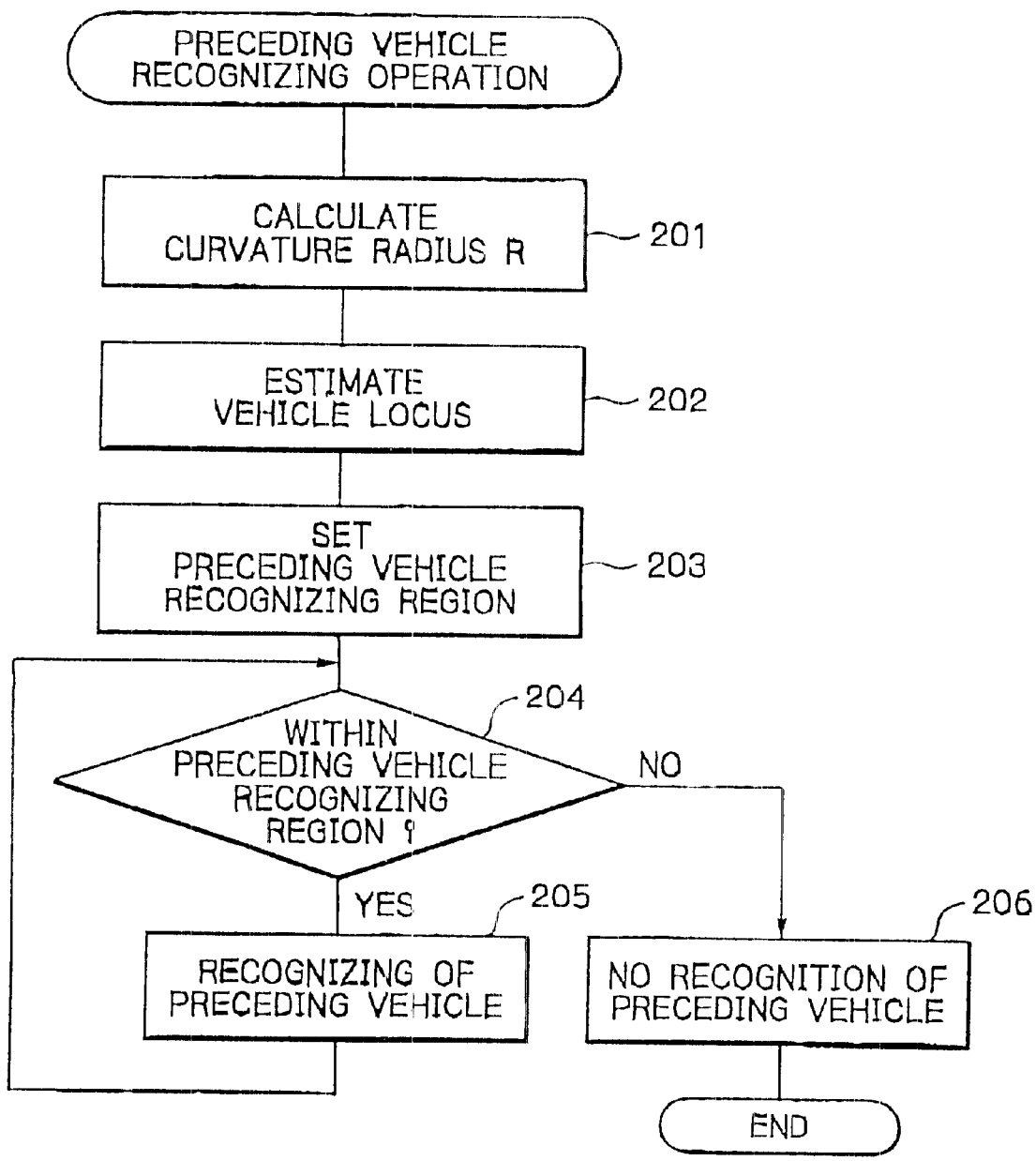
FIG. 2 is a flowchart for explaining the operation of the preceding vehicle recognizing apparatus of FIG. 1 where the electronic control unit is constructed by a microcomputer.

The vehicle locus estimating section 41 receives the vehicle speed SPD of the vehicle speed sensor 2 and the rotational angular speed ω of the yaw rate sensor 3 to estimate a locus of the vehicle V. That is, the vehicle locus estimating section 41 calculates a radius R of curvature of a lane on which the vehicle V is traveling, and estimates the vehicle locus in accordance with the vehicle speed SPD and the curvature radius R of the lane. Then, the preceding vehicle recognizing region setting section 42 sets a preceding vehicle recognizing region RR as shown in FIGS. 3, 5 and 7 in accordance with the estimated vehicle locus. Then, the preceding vehicle recognizing section 43 determines whether or not the X- and Y-locations of the preceding vehicle PV are within the set preceding vehicle recognizing region RR. As a result, when the X- and Y-locations of the preceding vehicle PV are within the preceding vehicle recognizing region RR, the preceding vehicle PV is displayed on the display unit 5, and the vehicle speed control unit 6 is operated. Otherwise, i.e., when the X- and Y-locations of the preceding vehicle PV is not within the preceding vehicle recognizing region RR, the display unit 5 and the vehicle speed control unit 6 are not operated. The electric control unit 4 can be constructed by a microcomputer including a central processing unit (CPU), a read-only memory (ROM), a random access memory (RAM) and the like. In this case, the electric control unit 4 is operated in accordance with a flowchart as illustrated in FIG. 2 which is started when the preceding vehicle detector 1 detects a preceding vehicle PV as a target.

First, at step 201, the CPU calculates a curvature radius R of the vehicle V in accordance with the rotational angular speed ω of the yaw rate sensor 3.

Next, at step 202, the CPU estimates a vehicle locus of the vehicle V in accordance with the vehicle speed SPD of the vehicle speed sensor 2 and the rotational angular speed ω of the yaw rate sensor 3.

Next, at step 203, the CPU sets a preceding vehicle recognizing region in accordance with the vehicle locus of the vehicle V. In this case, this preceding vehicle recognizing region is defined by two X-coordinates centered at a location of the vehicle V on the estimated vehicle locus at a timing when the vehicle V reaches the Y-location of the target preceding vehicle PV.

Next, at step 204, the CPU determines whether or not the target preceding vehicle PV is within the preceding vehicle recognizing region, i.e., whether or not the X-location is within the above-mentioned two X-coordinates. As a result, when the target preceding vehicle PV is within the preceding vehicle recognizing region, the control proceeds to step 205 which establishes a recognition of the preceding vehicle to operate the display unit 5 and the vehicle speed control unit 6. On the other hand, when the target preceding vehicle PV is not within the preceding vehicle recognizing region, the control proceeds to step 206 which establishes no recognition of the preceding vehicle so that the display unit 5 and the vehicle speed control unit 6 are not operated.

The operations at steps 204 and 205 are repeated until the target preceding vehicle PV is lost in the preceding vehicle sensor 1.

Examples of the operation of the preceding vehicle recognizing apparatus of FIG. 1 are explained next with reference to FIGS. 3, 4, 5, 6, 7, 8A, 8B and 8C.

Figure 4:
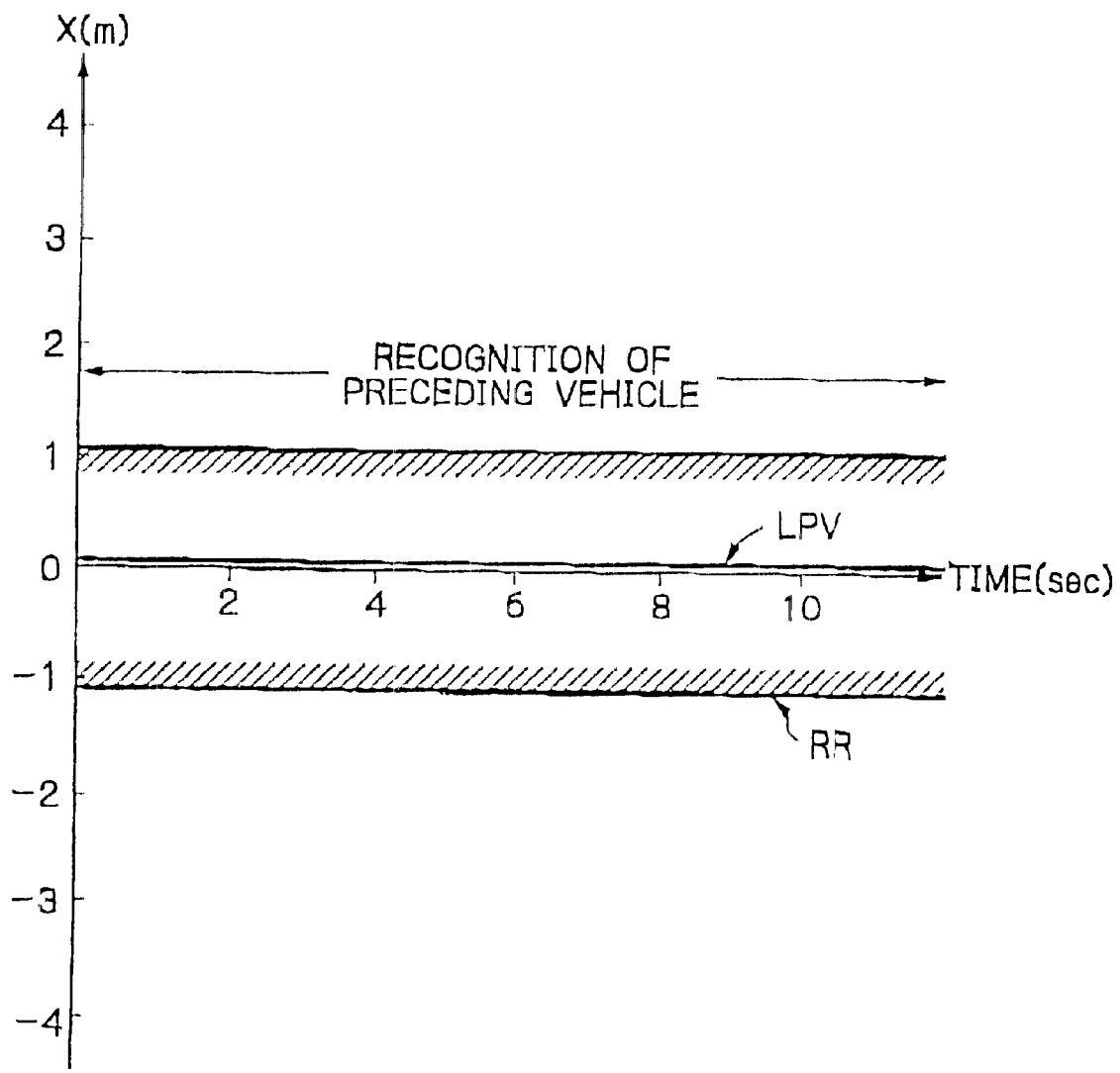
FIG. 4 is a timing diagram of the first example of the operation of FIG. 3.

FIG. 3 is a diagram where the target preceding vehicle PV continues traveling on the same lane on a non-curved expressway as the vehicle V. In this case, a preceding vehicle recognizing region RR for the target preceding vehicle PV is as shown in FIG. 4, and a locus LPV of the preceding vehicle PV keeps approximately centered at the preceding vehicle recognizing region RR. Thus, recognition of the preceding vehicle is maintained.

FIG. 5 is a diagram where the target preceding vehicle PV is traveling on the same lane on a non-curved expressway as the vehicle V, and then, carries out a lane change. In this case, a preceding vehicle recognizing region RR for the target preceding vehicle PV is as shown in FIG. 5, and at timing t1, a locus LPV of the preceding vehicle PV is deviated from the preceding vehicle recognizing region RR. Thus, no recognition of the preceding vehicle is established after timing t1.

FIG. 7 is a diagram where the target preceding vehicle continues traveling on the same lane on a curved expressway as the vehicle V. For example, the vehicle V and the preceding vehicle PV are both traveling at a speed of 100 km/h.

Assume that the distance between the vehicle V and the target preceding vehicle PV is relatively small, i.e., 40 m and the curvature radius R is relatively small, i.e., 300 m. In this case, a preceding vehicle recognizing region RR for the target preceding vehicle PV is as shown in FIG. 8A. That is, at timing t1, i.e., at about 1.5 sec, the vehicle V enters the curved expressway, to decrease the curvature radius R of the vehicle V, so that the preceding vehicle recognizing region RR is moved in the +X direction. However, since the target preceding vehicle PV is still in the preceding vehicle recognizing region RR, the recognition of the preceding vehicle is maintained.

Next, assume that the distance between the vehicle V and the target preceding vehicle PV is relatively large, i.e., 70 m and the curvature radius R is relatively large, i.e., 700 m. In this case, a preceding vehicle recognizing region RR for the target preceding vehicle PV is as shown in FIG. 8B. That is, at timing t1, i.e., at about 2.6 sec, the vehicle V enters the curved expressway, to decrease the curvature radius R of the vehicle V, so that the preceding vehicle recognizing region RR is moved in the +X direction. Then, at timing t2, i.e., at about 2.8 sec, when the target preceding vehicle PV is deviated from the preceding vehicle recognizing region RR, no recognition of the preceding vehicle is established. Then, at timing t3, i.e., at about 3.8 sec, the target preceding vehicle PV again enters the preceding vehicle recognizing region RR, so that recognition of the preceding vehicle is again established. Thereafter, the recognition of the preceding vehicle is maintained.

Figure 8C:
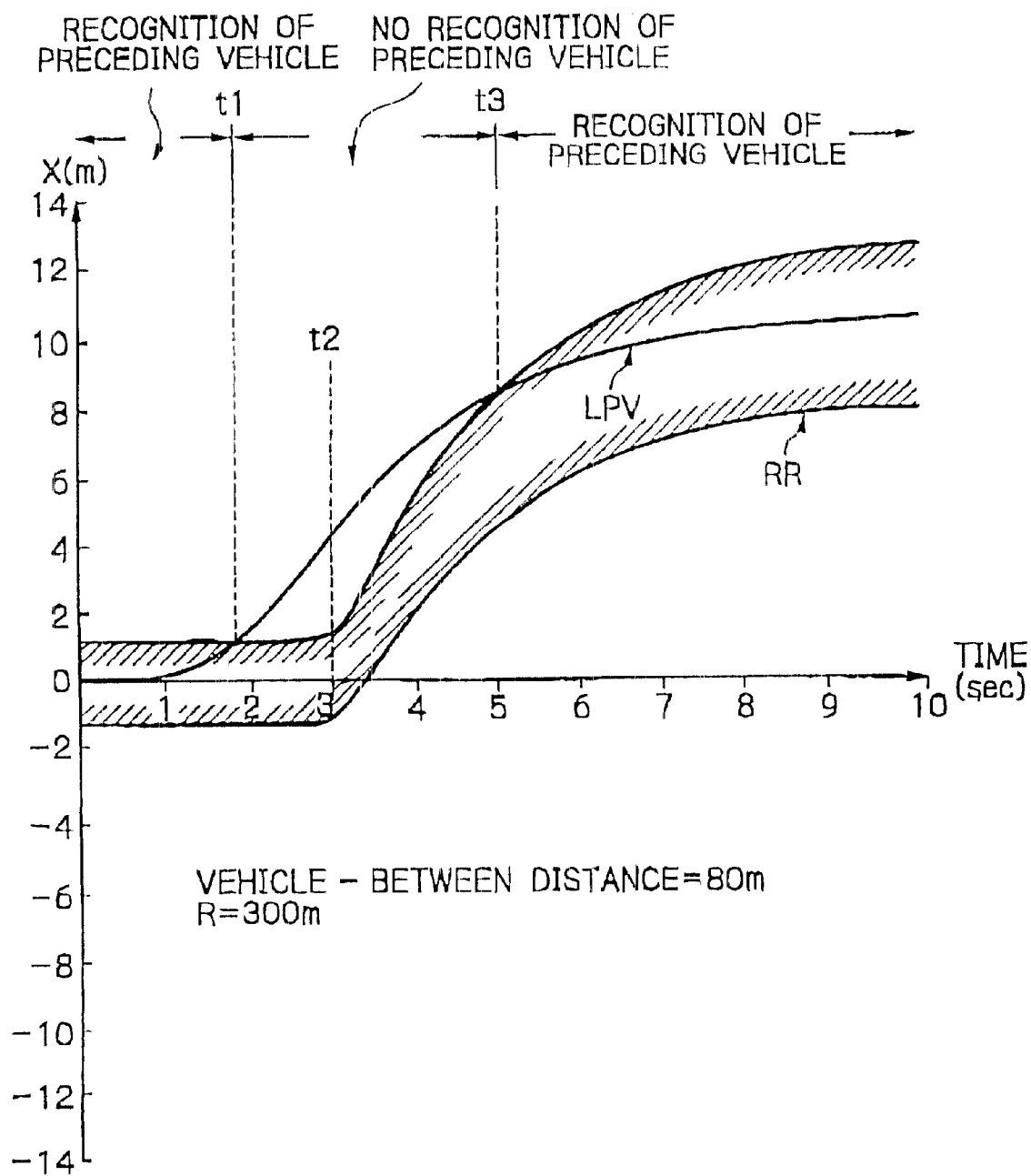

Further, assume that the distance between the vehicle V and the target preceding vehicle PV is relatively large, i.e., 80 m and the curvature radius R is relatively large, i.e., 300 m. In this case, a preceding vehicle recognizing region RR for the target preceding vehicle PV is as shown in FIG. 8C. That is, at timing t1, i.e., at about 1.9 sec, when the target preceding vehicle PV is deviated from the preceding vehicle recognizing region RR, no recognition of the preceding vehicle is established. Then, at timing t1, i.e., at about 2.8 sec, the vehicle V enters the curved expressway, to decrease the curvature radius R of the vehicle V, so that the preceding vehicle recognizing region RR is moved in the +X direction. Then, at timing t3, i.e., at about 5.0 sec, the target preceding vehicle PV again enters the preceding vehicle recognizing region RR, so that recognition of the preceding vehicle is again established. Thereafter, the recognition of the preceding vehicle is maintained.

Thus, for a time period from timing t2 to timing t3 of FIG. 8B and for a time period from timing t1 to timing t3 of FIG. 8C, the target preceding vehicle PV is excluded from the recognition of the preceding vehicle. In this case, it is considered that the target preceding vehicle PV carries out a lane change despite the fact that the target preceding vehicle PV actually continues travelling on the same lane. This erroneously operates the display unit 5 and the vehicle speed control unit 6. For example, a preceding vehicle recognizing operation may be performed upon another preceding vehicle for that time period, so that the vehicle speed control unit 6 would make the vehicle V follow after the other preceding vehicle.

In FIG. 9, which illustrates an embodiment of the preceding vehicle recognizing apparatus according to the present invention, the electronic control unit 4 of FIG. 1 is modified into an electronic control unit 4' which includes a modified preceding vehicle recognizing section 43' instead of the preceding vehicle recognizing section 43 of FIG. 1, and a curved road determining section 44. The curved road determining section 44 monitors the X-location of the preceding vehicle PV to determine whether or not an expressway on which the preceding vehicle PV is traveling is curved. For example, if the expressway is not curved, the vehicle V would have carried out a lane change or the like. The curved road determining section 44 is operated by the preceding vehicle recognizing section 43' as set forth below.

First, when the preceding vehicle PV is deviated from the preceding vehicle recognizing region RR, the preceding vehicle recognizing section 43' operates the curved road determining section 44 without releasing the recognition of the preceding vehicle.

Next, the curved road determining section 44 determines whether or not the expressway on which the preceding vehicle PV is traveling is curved. The determination result of the curved road determining section 44 is supplied to the preceding vehicle recognizing section 43'.

When the expressway on which the preceding vehicle PV is traveling is not curved, the preceding vehicle recognizing section 43' releases the recognition of the preceding vehicle.

On the other hand, when the expressway on which the preceding vehicle PV is traveling is curved, the preceding vehicle recognizing section 43' keeps determining whether or not the preceding vehicle PV is within the preceding vehicle recognizing region RR for a predetermined time period. As a result, when the preceding vehicle PV is within the preceding vehicle recognizing region RR for that predetermined time period, the recognition of the preceding vehicle is not released. On the other hand, when the preceding vehicle PV is never within the preceding vehicle recognizing region RR for that predetermined time period, the recognition of the preceding vehicle is released.

Figure 10:
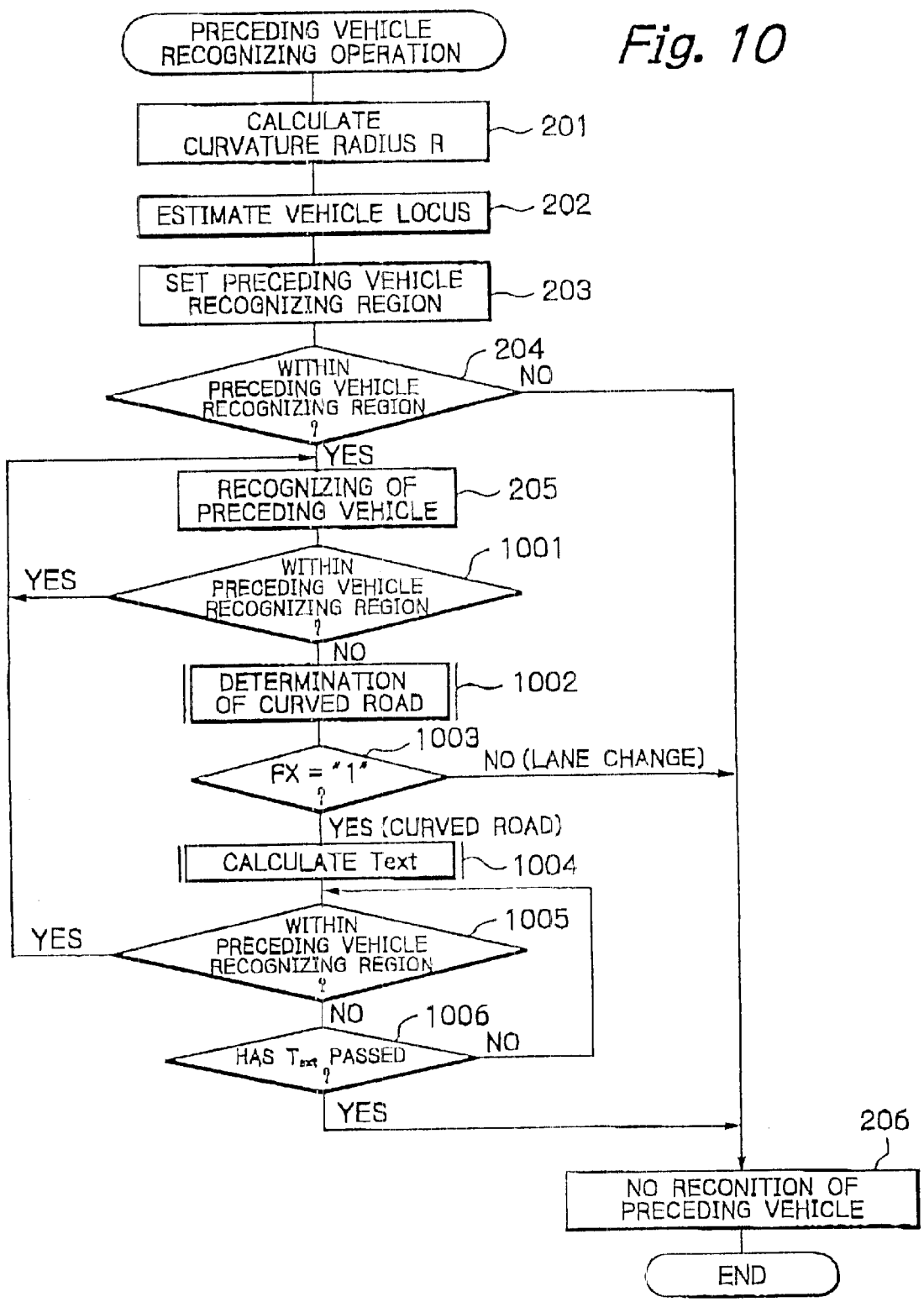
FIG. 10 is a flowchart for explaining the operation of the preceding vehicle recognizing apparatus of FIG. 9 where the electronic control unit is constructed by a microcomputer.

The electronic control unit 4' can also be constructed by a microcomputer. In this case, the electronic control unit 4' is operated in accordance with a flowchart as illustrated in FIG. 10. In FIG. 10, steps 1001 through 1006 are added to the steps of FIG. 2.

After the recognition of the preceding vehicle is established at step 205, the control proceeds to step 1001 which determines whether or not the preceding vehicle PV is within the preceding vehicle recognizing region RR. As a result, while the preceding vehicle PV is within the preceding vehicle recognizing region RR, the recognition of the preceding vehicle is maintained. On the other hand, when the preceding vehicle PV is deviated from the preceding vehicle recognizing region RR, the control proceeds to step 1002 which determines whether or not the expressway on which the preceding vehicle PV is traveling is curved. This curved road determination step 1002 sets a flag FX in accordance with whether or not the expressway on which the preceding vehicle PV is traveling is curved. For example, the value "1" of the flag FX means a curved road, while the value "0" of the flag FX means a lane change. This will be explained later in detail with reference to FIGS. 11A, 11B, 12A, 12B and 13A, 13B.

At step 1003, it is determined whether FX="1" (curved road) or FX="0" (lane change) is satisfied. When FX="1" (curved road), the control proceeds to step 1004 which set a predetermined time period $T_{ext}$ depending upon the vehicle speed SPD or the like. On the other hand, when FX="0" (lane change), the control proceeds to step 206 which establishes no recognition of the preceding vehicle, i.e., releases the recognition of the preceding vehicle.

Note that the predetermined time period $T_{ext}$ is experimentally defined. For example, the smaller the vehicle speed SPD, the longer the predetermined time period $T_{ext}$. Also, the predetermined time period $T_{ext}$ can depend upon the rotational angular speed ω, i.e., the curvature radius R of the preceding vehicle PV. In this case, the smaller the curvature radius R, the longer the predetermined time period $T_{ext}$. Further, the predetermined time period $T_{ext}$ can depend upon the vehicle-between distance. In this case, the larger the vehicle-between distance, the longer the predetermined time period $T_{ext}$.

The control at step 1004 proceeds to steps 1005 and 1006. That is, at steps 1005 and 1006, it is determined whether or not the preceding vehicle PV is within the preceding vehicle recognizing region RR for the predetermined time period $T_{ext}$. As a result, when the preceding vehicle PV enters the preceding vehicle recognizing region RR for the predetermined time period $T_{ext}$, the control returns to step 205, so that the recognition of the preceding vehicle is maintained. On the other hand, when the preceding vehicle PV has never entered the preceding vehicle recognizing region RR for the predetermined time period $T_{ext}$, the control proceeds to step 206 which establishes no recognition of the preceding vehicle, i.e., releases the recognition of the preceding vehicle.

A first example of step 1002 is explained next with reference to FIGS. 11 and 12.

First, at step 1101, it is determined whether or not a waiting time period T1 has passed. Only when the waiting time period T1 has passed, does the control proceed to step 1102 which initializes a value N, i.e., $$N \leftarrow 0.$$

Next, at step 1103, the X-location X of the preceding vehide PV is fetched, and at step 1104, $$X0 \leftarrow X$$

Next, at step 1105, it is determined whether or not a determining time period T2 has passed. When the determining time period T2 has not passed, the control proceeds to steps 1106 through 1110. On the other hand, when the determining time period T2 has passed, the control proceeds to steps 1111 through 1113.

Steps 1106 through 1110 are explained next. At step 1106, the X-location of the preceding vehicle PV is fetched.

Next, at step 1107, it is determined whether or not a time period Δt (<T2) such as 100 ms has passed. Only when the time period Δt has passed, does the control proceed to step 1108 which calculates a difference ΔX of the X-location of the preceding vehicle PV by $$\Delta X \leftarrow X - X0$$

Next, at step 1109, it is determined whether or not an absolute value of ΔX is larger than a threshold value $\Delta X_{th}$, i.e., $$|\Delta X| > \Delta X_{th}$$

where $\Delta X_{th}$ is a definite value corresponding to the width of a lane such 3.5 m plus a margin such as 1.5 m. Only when $|\Delta X| > \Delta X_{th}$, does the control proceed to step 1110 which increases the value N by+1. Then, the operations at step 1104 through 1110 are repeated until the determining time period T2 has passed.

Steps 1111 through 1113 are explained next.

At step 1111, it is determined whether or not the value N is larger than a threshold value $N_{th}$. When $N > N_{th}$, the control proceeds to step 1112 which sets the flag FX, which means that the expressway on which the preceding vehicle PV is traveling is curved. On the other hand, when $N \leq N_{th}$, the control proceeds to step 1113 which resets the flag FX, which means that the preceding vehicle PV has carried out a lane change.

Then, the control returns to step 1003 of FIG. 10.

Figure 11:
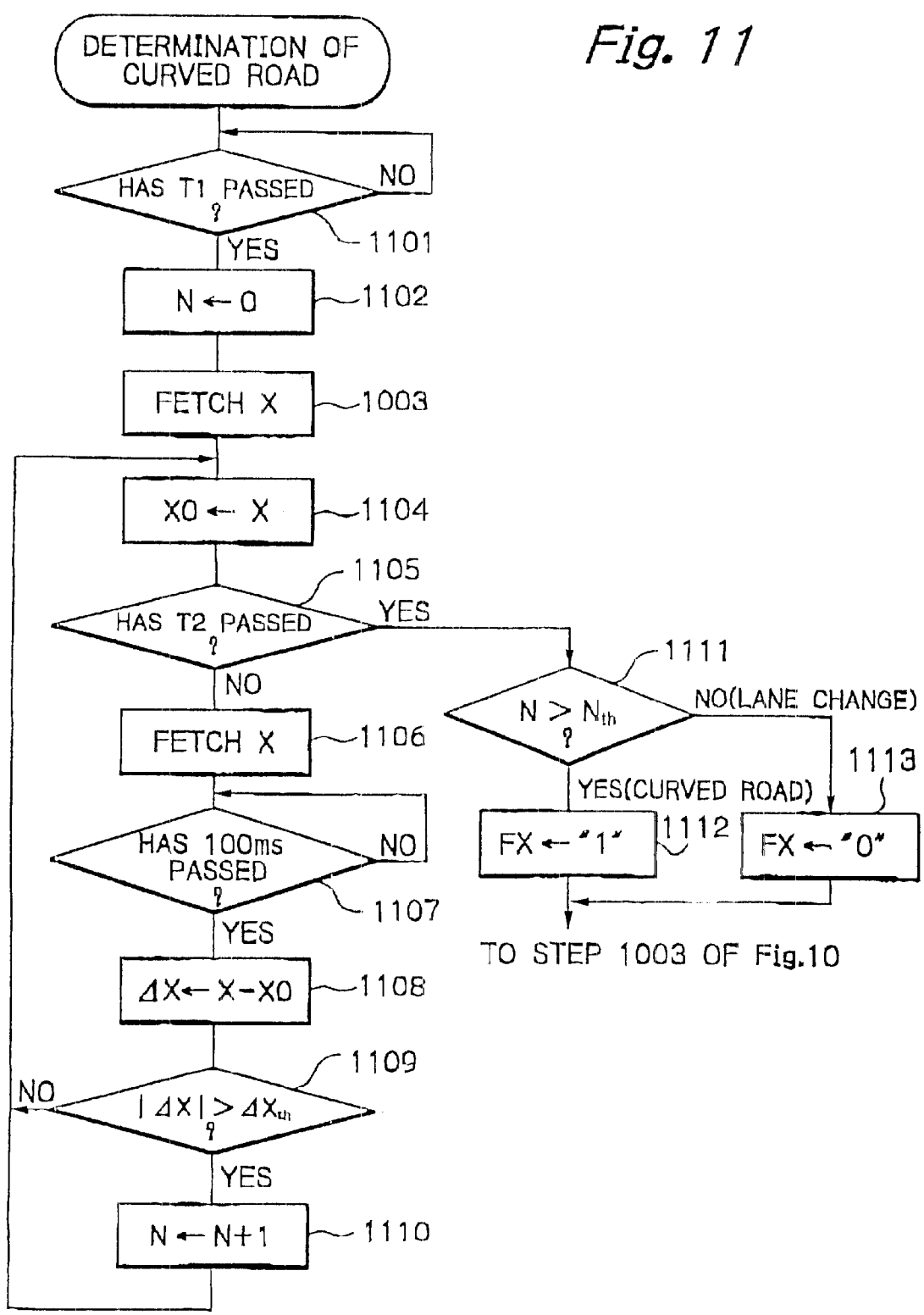
FIG. 11 is a first example of a detailed flowchart of step 1002 of FIG. 10.
Figure 12:
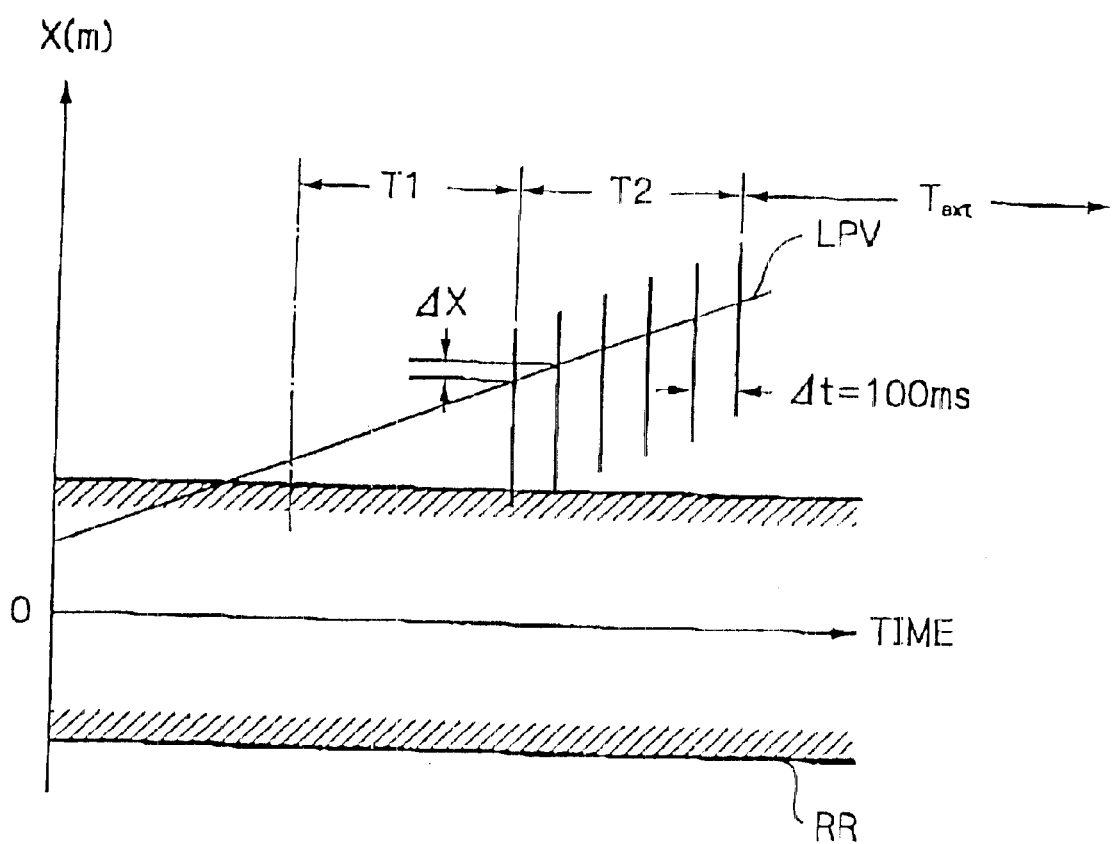
FIG. 12 is a timing diagram for explaining the flowchart of FIG. 11.

In FIGS. 11 and 12, since the operations at steps 1104 through 1110 are repeated to exclude fluctuations by noise erroneous determination of a curved road can be suppressed.

Figure 13:
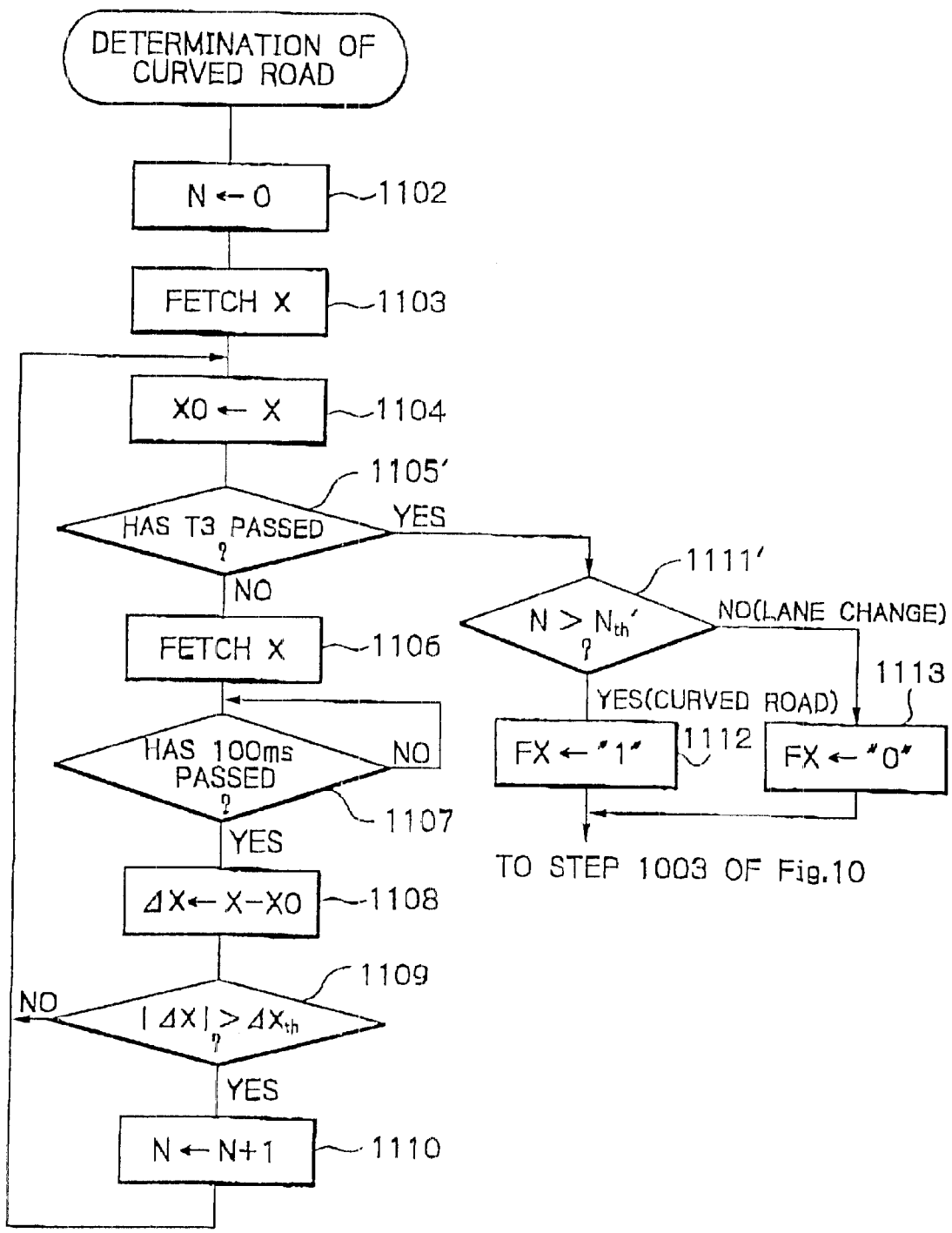
FIG. 13 is a second example of a detailed flowchart of step 1002 of FIG. 10.

A second example of step 1002 is explained next with reference to FIGS. 13 and 14. In FIG. 13, step 1101 of FIG. 11 is deleted, and steps 1105 and 1111 of FIG. 11 are modified to steps 1105' and 1111', respectively.

First, at step 1102, a value N is initialized, i.e., $$N \leftarrow 0.$$

Next, at step 1103, the X-location X of the preceding vehide PV is fetched, and at step 1104, $$X0 \leftarrow X$$

Next, at step 1105', it is determined whether or not a determining time period T3 has passed. Note that T3 corresponds to T1+T2 of FIGS. 11 and 12. When the determining time period T3 has not passed, the control proceeds to steps 1106 through 1110. On the other hand, when the determining time period T3 has passed, the control proceeds to steps 1111' through 1113.

Steps 1106 through 1110 are explained next.

At step 1106, the X-location of the preceding vehicle PV is fetched.

Next, at step 1107, it is determined whether or not a time period Δt (<T3) such as 100 ms has passed. Only when the time period Δt has passed, does the control proceed to step 1108 which calculates a difference Δ X of the X-location of the preceding vehicle PV by $$\Delta X \leftarrow X - X0$$

Next, at step 1109, it is determined whether or not an absolute value of ΔX is larger than a threshold value $\Delta X_{th}$, i.e., $$|\Delta X| > \Delta X_{th}$$

where $\Delta X_{th}$ is a definite value corresponding to the width of a lane such 3.5 m plus a margin such as 1.5 m. Only when $|\Delta X| > \Delta X_{th}$, does the control proceed to step 1110 which increases the value N by +1. Then, the operations at steps 1104 through 1110 are repeated until the determining time period T3 has passed.

Steps 1111' through 1113 are explained next.

At step 1111', it is determined whether or not the value N is larger than a threshold value $N_{th}'$. Note that $N_{th}'$ is larger than $N_{th}$ of step 1111 of FIG. 11. When $N > N_{th}'$, the control proceeds to step 1112 which sets the flag FX, which means that the expressway on which the preceding vehicle PV is traveling is curved. On the other hand, when $N \leq N_{th}'$, the control proceeds to step 1113 which resets the flag FX, which means that the preceding vehicle PV has carried out a lane change.

Then, the control returns to step 1003 of FIG. 10.

Figure 14:
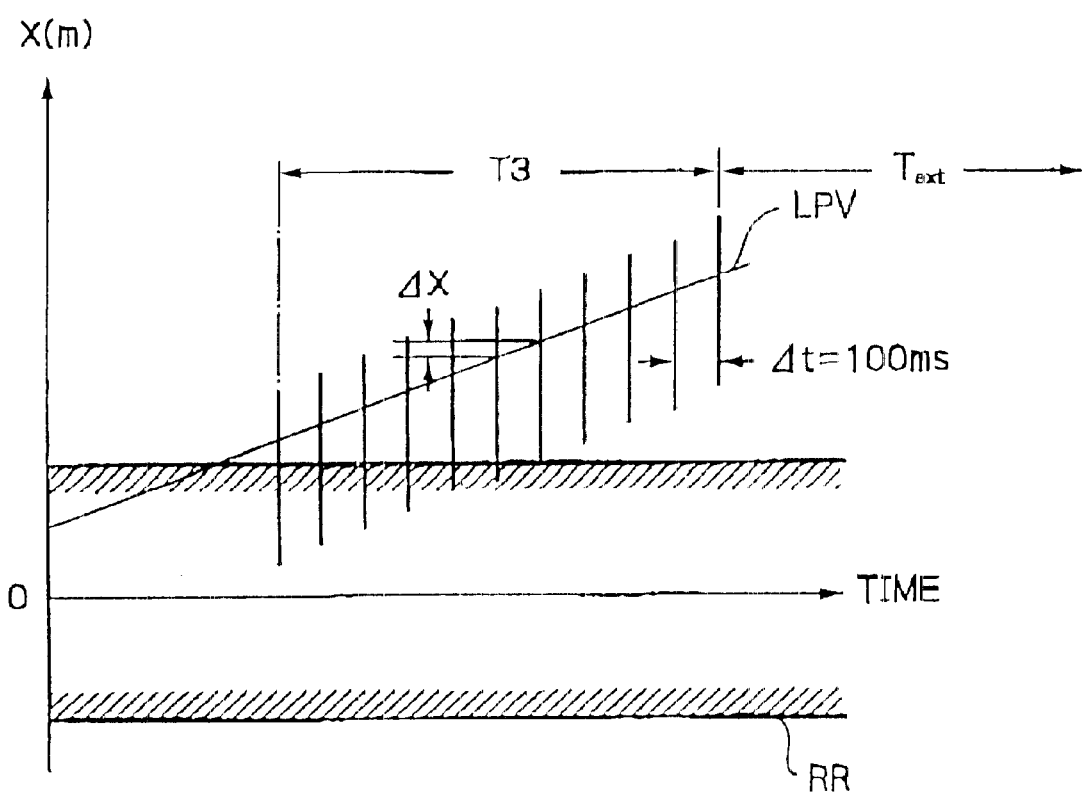
FIG. 14 is a timing diagram for explaining the flowchart of FIG. 13.

Even in FIGS. 13 and 14, since the operations at steps 1104 through 1110 are repeated to exclude fluctuations by noise erroneous determination of a curved road can be suppressed.

A third example of step 1002 is explained next with reference to FIGS. 15 and 16. In FIG. 13, step 1102, 1103, 1104, 1110 and 1111' of FIG. 13 is deleted.

First, at step 1105', it is determined whether or not a determining time period T3 has passed. Only when the determining time period T3 has passed, does the control proceed to steps 1106 through 1109, 1112 and 1113.

At step 1106, the X-location of the preceding vehicle PV is fetched as an intitial value X0.

Next, at step 1107, it is determined whether or not a time period Δt (<T3) such as 100 ms has passed. Only when the time period Δt has passed, does the control proceed to step 1108 which calculates a difference ΔX of the X-location of the preceding vehicle PV by $$\Delta X \leftarrow X - X0$$

Next, at step 1109, it is determined whether or not an absolute value of ΔX is larger than a threshold value $\Delta X_{th}$, i.e., $$|\Delta X| > \Delta X_{th}$$

where $\Delta X_{th}$ is a definite value corresponding to the width of a lane such 3.5 m plus a margin such as 1.5 m. When $|\Delta X| > \Delta X_{th}$, the control proceeds to step 1112 which sets the flag FX, which means that the expressway on which the preceding vehicle PV is traveling is curved. On the other hand, when $|\Delta X| \leq \Delta X_{th}$, the control proceeds to step 1113 which resets the flag FX, which means that the preceding vehicle PV has carried out a lane change.

Then, the control returns to step 1003 of FIG. 10.

Figure 15:
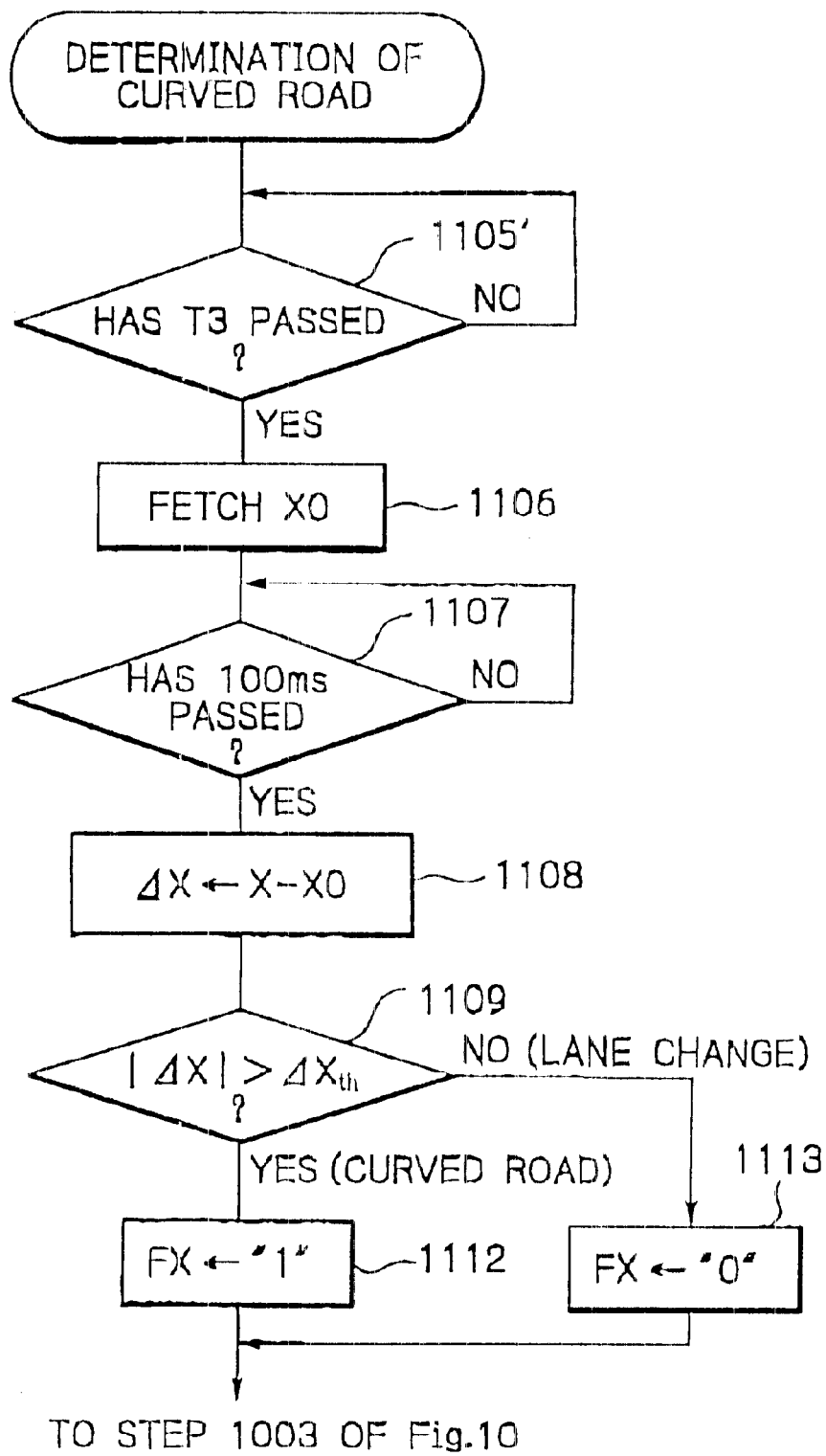
FIG. 15 is a third example of a detailed flowchart of step 1002 of FIG. 10.
Figure 16:
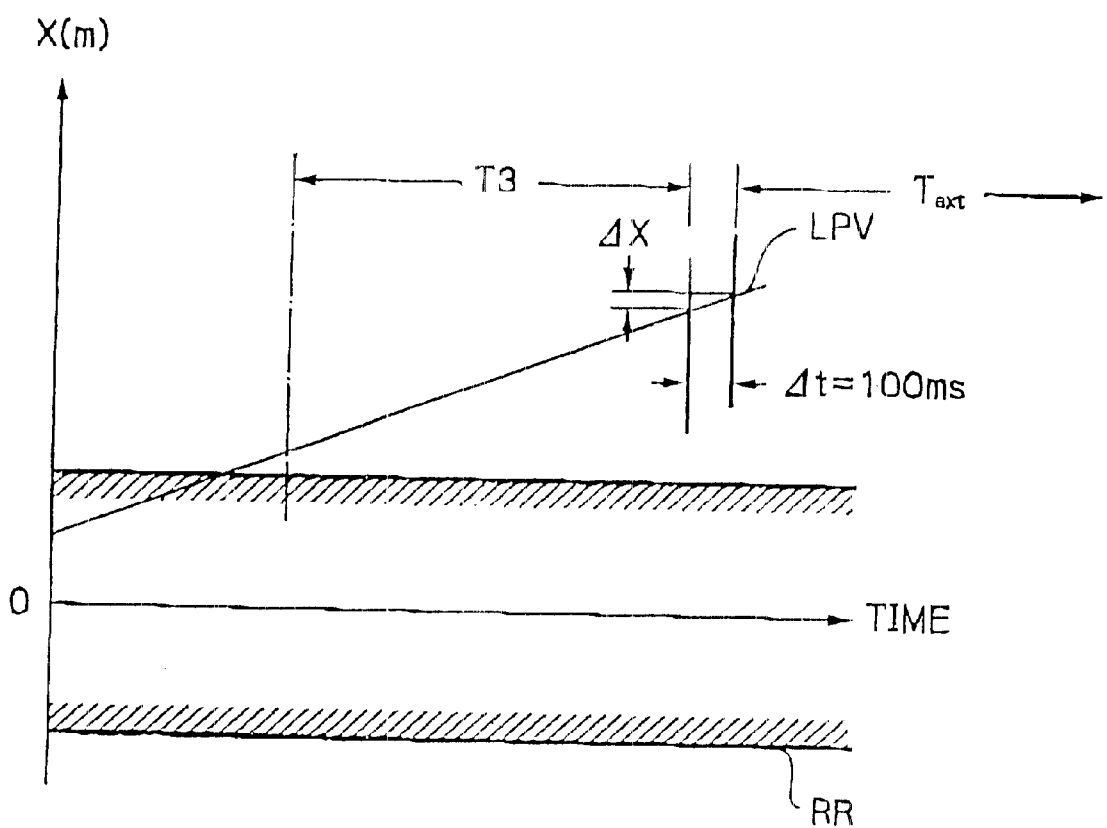
FIG. 16 is a timing diagram for explaining the flowchart of FIG. 14.

In FIGS. 15 and 16, since the operations at steps 1106 through 1108, 1112 and 1113 are carried out only one time, the noise fluctuation characteristics are deteriorated as compared with the first and second examples as illustrated in FIGS. 11, 12, 13 and 14.

Figure 6:
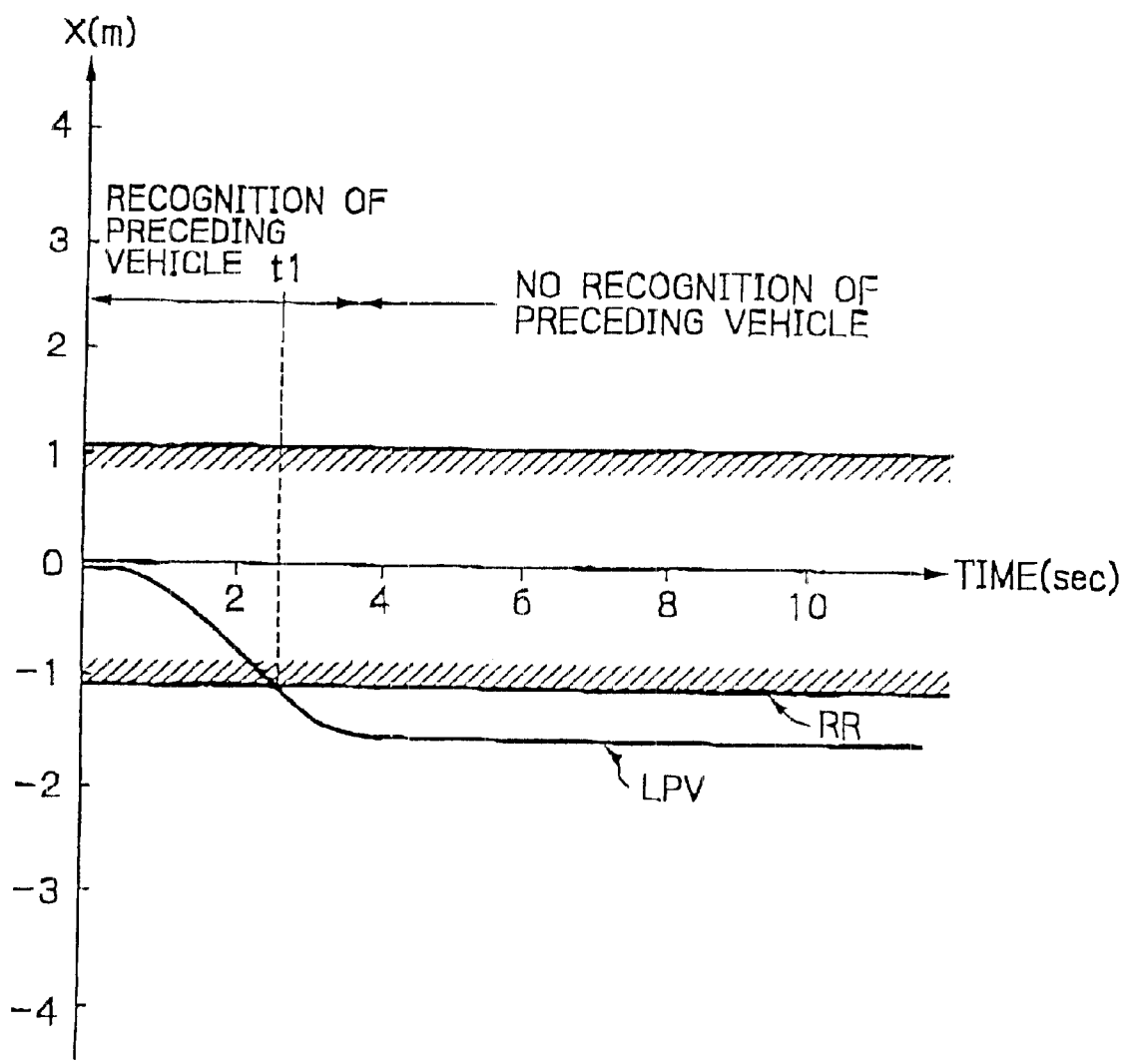
FIG. 6 is a timing diagram of the second example of the operation of FIG. 5.
Figure 17A:
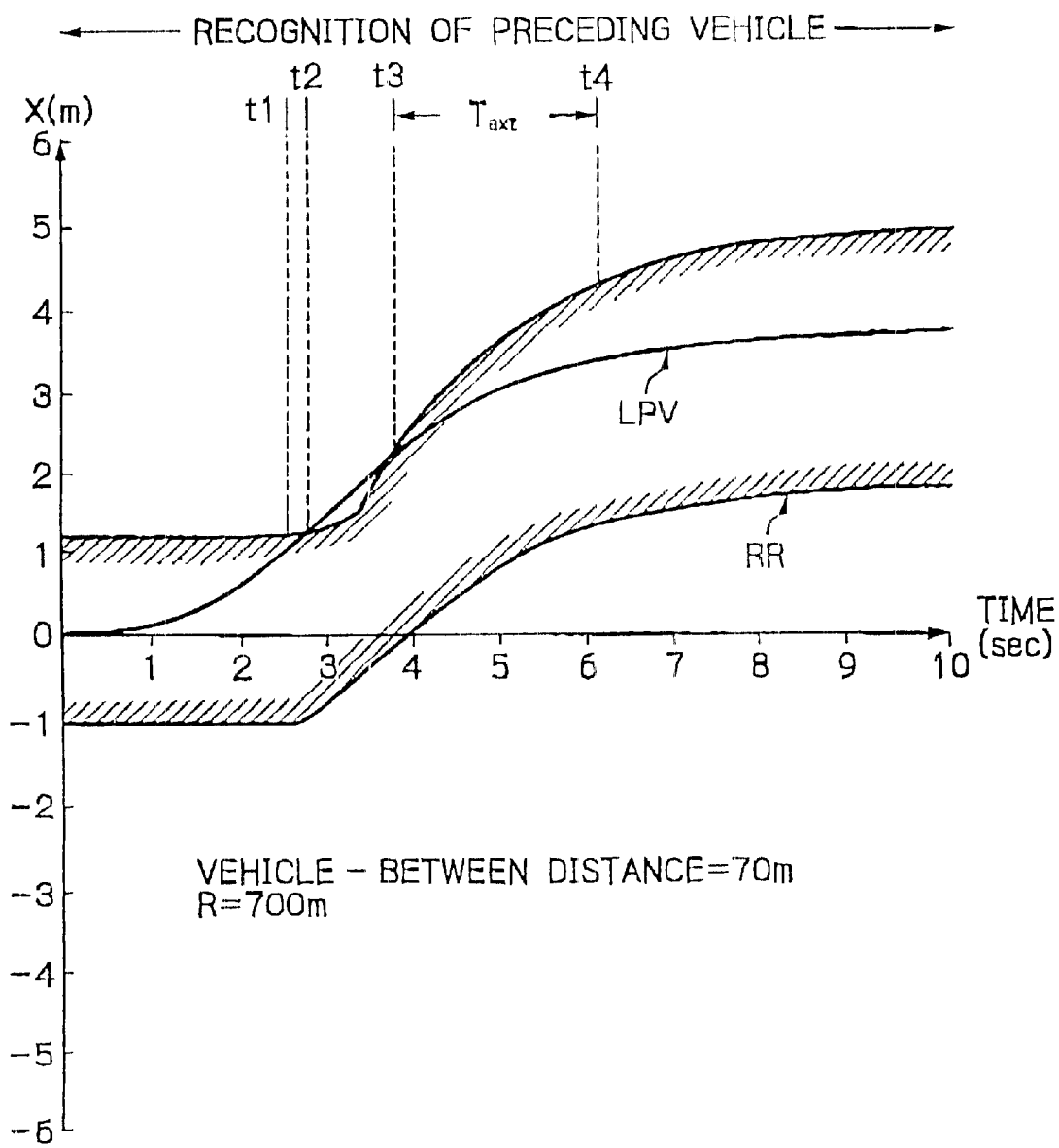
FIGS. 17A and 17B are timing diagrams of examples of the operation of FIG. 9.
Figure 17B:
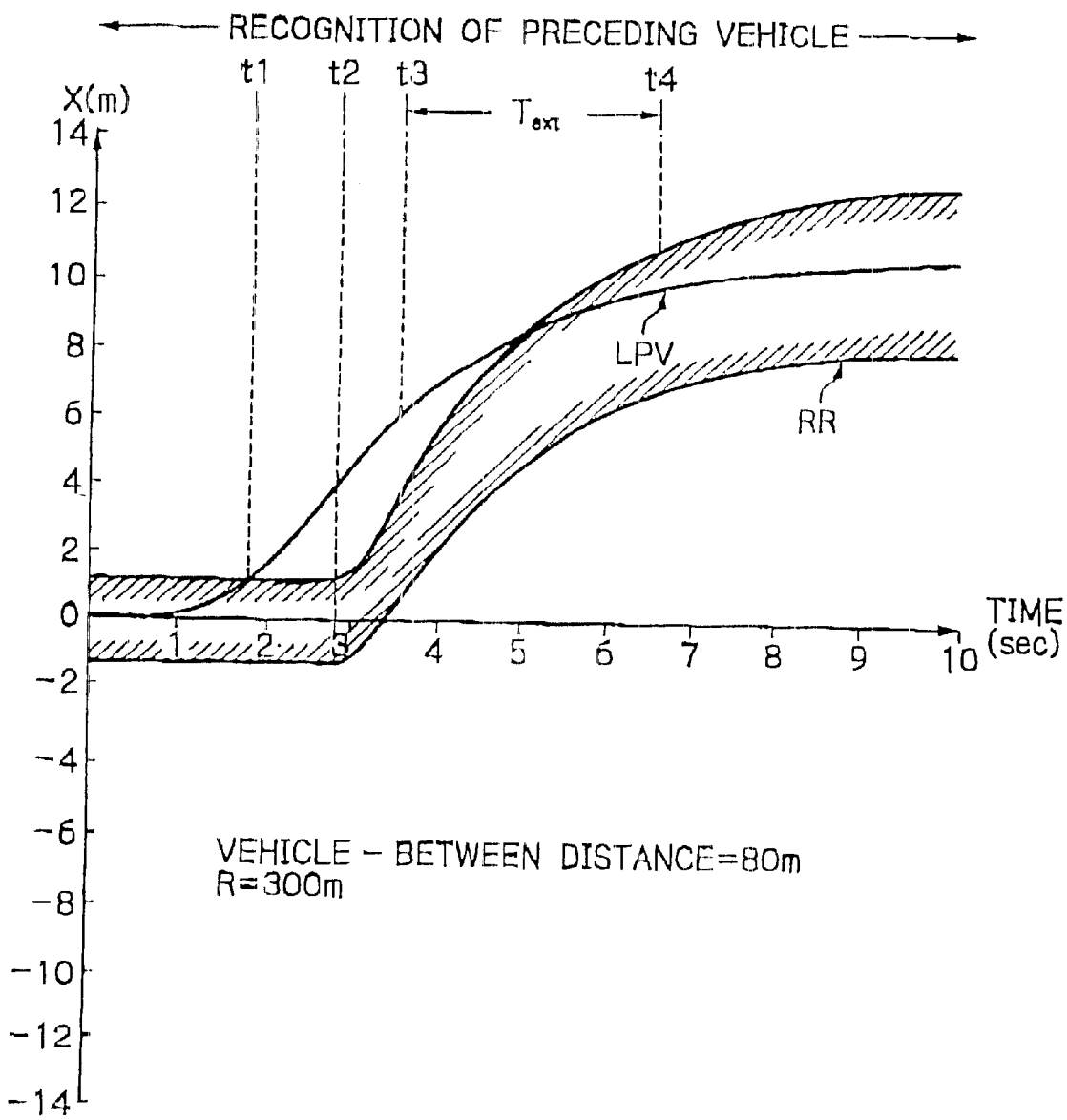

The effect of the embodiment of the present invention is explained next with reference to FIGS. 17A and 17B which correspond to FIGS. 8B and 8C, respectively, of the prior art. Note that no problems occur in the cases as shown in FIGS. 4, 6 and 8A. As shown in FIGS. 17A and 17B, at timing t1, i.e., at about 2.6 sec, the vehicle V enters the curved expressway, to decrease the curvature radius R of the vehicle V, so that the preceding vehicle recognizing region RR is moved to the +V direction. Then, at timing t2, i.e., at about 2.8 sec, the target preceding vehicle PV is deviated from the preceding vehicle recognizing region RR, so that a curved road determination is carried out while the recognition of the preceding vehicle is maintained. As a result, at timing t3, it is determined that the expressway on which the preceding vehicle PV is traveling is curved, a predetermined time period $T_{ext}$ from timing t3 to timing t4 is set to determine whether the preceding vehicle PV is within the preceding vehicle recognizing region RR. As a result, since the preceding vehicle PV is within the preceding vehicle recognizing region RR, the recognition of the preceding vehicle is maintained even when the preceding vehicle PV is deviated from the preceding vehicle recognizing region RR due to the curved expressway.

The preceding vehicle recognizing apparatus according to the present invention can be applied to an auto cruise control (ACC) of a vehicle, to make it smooth.

As explained hereinabove, according to the present invention, an erroneous operation of the preceding vehicle recognizing apparatus due to a curved road can be suppressed.

What is claimed is:

1. A method for recognizing a preceding vehicle traveling on a traffic lane on which a subject vehicle is traveling, comprising the steps of:

setting a preceding vehicle recognizing region ahead of said subject vehicle;

determining whether or not said preceding vehicle is deviated from said preceding vehicle recognizing region;

determining whether or not said traffic lane is curved while maintaining recognition of said preceding vehicle, when said preceding vehicle is deviated from said preceding vehicle recognizing region;

determining whether or not said preceding vehicle has entered said preceding vehicle recognizing region for a predetermined time period while maintaining the recognition of said preceding vehicle, when said traffic lane is curved;

maintaining the recognition of said preceding vehicle, when said preceding vehicle has entered said preceding vehicle recognizing region for said predetermined time period; and releasing the recognition of said preceding vehicle, when said preceding vehicle does not remain in said preceding vehicle recognizing region for said predetermined time period.

2. The method as set forth in claim 1, wherein said preceding vehicle recognizing region setting step sets said preceding vehicle recognizing region in accordance with a speed of said subject vehicle and a curvature radius of a vehicle locus of said subject vehicle.

3. The method as set forth in claim 1, wherein said curved traffic lane determining step determines whether or not said traffic lane is curved in accordance with a motion distance of said preceding vehicle along a direction perpendicular to said traffic lane.

4. The method as set forth in claim 3, wherein said curved traffic lane determining step comprises the steps of:

determining whether or not a waiting time period has passed after said preceding vehicle is deviated from said preceding vehicle recognizing region;

determining whether said motion distance is larger than a first threshold value at every predetermined period time for a determining time period, after said waiting time period has passed;

counting a number of affirmative determinations that said motion distance is larger than said first threshold value; and determining whether or not the number of said affirmative determinations is larger than a second threshold value, so that said traffic lane is determined to be curved, when the number of said affirmative determinations is larger than said second threshold value.

5. The method as set forth in claim 3, wherein said curved traffic lane determining step comprises the steps of:

determining whether said motion distance is larger than a first threshold value at every predetermined period time for a determining time period, after said preceding vehicle is deviated from said preceding vehicle recognizing region;

counting a number of affirmative determinations that said motion distance is larger than said first threshold value; and determining whether or not the number of said affirmative determinations is larger than a second threshold value, so that said traffic lane is determined to be curved, when the number of said affirmative determinations is larger than said second threshold value.

6. The method as set forth in claim 3, wherein said curved traffic lane determining step comprises the steps of:

determining whether or not a waiting time period has passed after said preceding vehicle is deviated from said preceding vehicle recognizing region; and determining whether said motion distance is larger than a threshold value, after said waiting time period has passed, so that said traffic lane is determined to be curved when said motion distance is larger than said threshold value.

7. The method as set forth in claim 1, wherein said predetermined time period is changed in accordance with a speed of said subject vehicle.

8. The method as set forth in claim 1, wherein said predetermined time period is changed in accordance with a curvature radius of a vehicle locus of said subject vehicle.

9. The method as set forth in claim 1, wherein said predetermined time period is changed in accordance with a distance between said subject vehicle and said preceding vehicle.

10. A method for recognizing a preceding vehicle traveling on a traffic lane on which a subject vehicle is traveling, comprising the steps of:

setting a preceding vehicle recognizing region ahead of said subject vehicle;

determining whether or not said preceding vehicle is deviated from said preceding vehicle recognizing region;

determining whether or not a waiting time period has passed after said preceding vehicle is deviated from said preceding vehicle recognizing region;

determining whether a motion distance of said preceding vehicle along a direction perpendicular to said traffic lane is larger than a first threshold value at every predetermined period time for a determining time period, after said waiting time period has passed;

counting a number of affirmative determinations that said motion distance is larger than said first threshold value;

determining whether or not the number of said affirmative determinations is larger than a second threshold value, so that said traffic lane is determined to be curved, when the number of said affirmative determinations is larger than said second threshold value;

determining whether or not said preceding vehicle has entered said preceding vehicle recognizing region for a predetermined time period while maintaining the recognition of preceding vehicle, when said traffic lane is curved;

maintaining the recognition of said preceding vehicle, when said preceding vehicle has entered said preceding vehicle recognizing region for said predetermined time period; and releasing the recognition of said preceding vehicle, when said preceding vehicle does not remain in said preceding vehicle recognizing region for said predetermined time period.

11. A method for recognizing a preceding vehicle traveling on a traffic lane on which a subject vehicle is traveling, comprising the steps of:

setting a preceding vehicle recognizing region ahead of said subject vehicle;

determining whether or not said preceding vehicle is deviated from said preceding vehicle recognizing region;

determining whether said motion distance of said preceding vehicle along a distance perpendicular to said traffic lane is larger than a first threshold value at every predetermined period time for a determining time period, after said preceding vehicle is deviated from said preceding vehicle recognizing region;

counting a number of affirmative determinations that said motion distance is larger than said first threshold value;

determining whether or not the number of said affirmative determinations is larger than a second threshold value, so that said traffic lane is determined to be curved, when the number of said affirmative determinations is larger than said second threshold value;

determining whether or not said preceding vehicle has entered said preceding vehicle recognizing region for a predetermined time period while maintaining the recognition of preceding vehicle, when said traffic lane is curved;

maintaining the recognition of said preceding vehicle, when said preceding vehicle has entered said preceding vehicle recognizing region for said predetermined time period; and releasing the recognition of said preceding vehicle, when said preceding vehicle does not remain in preceding vehicle recognizing region for said predetermined time period.

12. A method for recognizing a preceding vehicle traveling on a traffic lane on which a subject vehicle is traveling, comprising the steps of:

setting a preceding vehicle recognizing region ahead of said subject vehicle;

determining whether or not said preceding vehicle is deviated from said preceding vehicle recognizing region;

determining whether or not a waiting time period has passed after said preceding vehicle is deviated from said preceding vehicle recognizing region;

determining whether said motion distance of said preceding vehicle along a direction perpendicular to said traffic lane is larger than a threshold value, after said waiting time period, so that said traffic lane is determined to be curved when said motion distance is larger than said threshold value;

determining whether or not said preceding vehicle has entered said preceding vehicle recognizing region for a predetermined time period while maintaining the recognition of preceding vehicle, when said traffic lane is curved;

maintaining the recognition of said preceding vehicle, when said preceding vehicle has entered said preceding vehicle recognizing region for said predetermined time period; and releasing the recognition of said preceding vehicle, when said preceding vehicle does not remain in preceding vehicle recognizing region for said predetermined time period.

13. An apparatus for recognizing a preceding vehicle traveling on a traffic lane on which a subject vehicle is traveling, comprising:

a preceding vehicle recognizing section for setting a preceding vehicle recognizing region ahead of said subject vehicle;

a preceding vehicle determining section for determining whether or not said preceding vehicle is deviated from said preceding vehicle recognizing region; and a curved road determining section for determining whether or not said traffic lane is curved while maintaining recognition of said preceding vehicle, when said preceding vehicle is deviated from said preceding vehicle recognizing region, said preceding vehicle recognizing section further determining whether or not said preceding vehicle has entered said preceding vehicle recognizing region for a predetermined time period while maintaining the recognition of said preceding vehicle, when said traffic lane is curved, so that the recognition of said preceding vehicle is maintained, when said preceding vehicle has entered said preceding vehicle recognizing region for said predetermined time period, while the recognition of said preceding vehicle is released, when said preceding vehicle does not remain in said preceding vehicle recognizing region for said predetermined time period.

14. The apparatus as set forth in claim 13, further comprising:

a vehicle speed sensor for detecting a speed of said subject vehicle;

a yaw sensor for detecting a yaw rate of said subject vehicle; and a vehicle locus estimating section for estimating a locus of said subject vehicle in accordance with the speed of said subject vehicle and the yaw rate of said subject vehicle, said preceding vehicle recognizing section setting said preceding vehicle recognizing region in accordance with said estimated locus of said subject vehicle.

15. The apparatus as set forth in claim 13, wherein said curved traffic lane determining section determines whether or not said traffic lane is curved in accordance with a motion distance of said preceding vehicle along a direction perpendicular to said traffic lane.

16. The apparatus as set forth in claim 15, wherein said curved traffic lane determining section comprises:

a unit for determining whether or not a waiting time period has passed after said preceding vehicle is deviated from said preceding vehicle recognizing region;

a unit for determining whether said motion distance is larger than a first threshold value at every predetermined period time for a determining time period, after said waiting time period has passed;

a unit for counting a number of affirmative determinations that said motion distance is larger than said first threshold value; and a unit for determining whether or not the number of said affirmative determinations is larger than a second threshold value, so that said traffic lane is determined to be curved, when the number of said affirmative determinations is larger than said second threshold value.

17. The apparatus as set forth in claim 15, wherein said curved traffic lane determining section comprises:

a unit for determining whether said motion distance is larger than a first threshold value at every predetermined period time for a determining time period, after said preceding vehicle is deviated from said preceding vehicle recognizing region;

a unit for counting a number of affirmative determinations that said motion distance is larger than said first threshold value; and a unit for determining whether or not the number of said affirmative determinations is larger than a second threshold value, so that said traffic lane is determined to be curved, when the number of said affirmative determinations is larger than said second threshold value.

18. The apparatus as set forth in claim 15, wherein said curved traffic lane determining section comprises:

a unit for determining whether or not a waiting time period has passed after said preceding vehicle is deviated from said preceding vehicle recognizing region; and a unit for determining whether said motion distance is larger than a threshold value, after said waiting time period has passed, so that said traffic lane is determined to be curved when said motion distance is larger than said threshold value.

19. The apparatus as set forth in claim 13, wherein said predetermined time period is changed in accordance with a speed of said subject vehicle.

20. The apparatus as set forth in claim 13, wherein said predetermined time period is changed in accordance with a curvature radius of a vehicle locus of said subject vehicle.

21. The apparatus as set forth in claim 13, wherein said predetermined time period is changed in accordance with a distance between said subject vehicle and said preceding vehicle.

* * * * *

UNITED STATES PATENT AND TRADEMARK OFFICE
CERTIFICATE OF CORRECTION

PATENT NO. : 6,629,036 B2
DATED : September 30, 2003
INVENTOR(S) : Manabu Hirao

It is certified that error appears in the above-identified patent and that said Letters Patent is hereby corrected as shown below:

<u>Title page,</u>
Item [73], Assignee, should read as follows:
-- Honda Elesys Co., Ltd
18-7, Hiraide Kogyodanchi
Utsunomiya-shi
Tochigi, Japan 321-0905 --

Signed and Sealed this

Second Day of December, 2003

JAMES E. ROGAN
*Director of the United States Patent and Trademark Office*